US 9,476,740 B2

(12) United States Patent
Zigovszki et al.

(10) Patent No.: US 9,476,740 B2
(45) Date of Patent: Oct. 25, 2016

(54) REVERSE FLOW DETECTION AND ANNUNCIATION

(71) Applicant: Mueller International, LLC, Atlanta, GA (US)

(72) Inventors: Szabolcs Zigovszki, Mableton, GA (US); Thomas Cullinan, Sagamore Beach, MA (US)

(73) Assignee: Mueller International, LLC, Atlanta, GA (US)

( * ) Notice: Subject to any disclaimer, the term of this patent is extended or adjusted under 35 U.S.C. 154(b) by 121 days.

(21) Appl. No.: 14/490,412

(22) Filed: Sep. 18, 2014

(65) Prior Publication Data

US 2016/0084679 A1    Mar. 24, 2016

(51) Int. Cl.
*G01D 4/18* (2006.01)
*G01D 7/00* (2006.01)

(52) U.S. Cl.
CPC ........................................ *G01D 7/00* (2013.01)

(58) Field of Classification Search
CPC .............................. G01D 4/002; G01D 4/004
USPC ........................................ 340/870.02, 870.09
See application file for complete search history.

(56) References Cited

U.S. PATENT DOCUMENTS

| 3,045,486 | A | 7/1962 | Thomas et al. |
| 3,067,612 | A | 12/1962 | Smith |
| 3,308,664 | A | 3/1967 | Kullmann |
| 4,663,970 | A | 5/1987 | Sutherland |
| 4,995,643 | A | 2/1991 | Rappart et al. |
| 5,086,292 | A | 2/1992 | Johnson |
| 5,099,348 | A | 3/1992 | Huddleston et al. |
| 5,339,686 | A | 8/1994 | DeJarlais et al. |
| 5,473,322 | A | 12/1995 | Carney |
| 5,631,554 | A | 5/1997 | Briese |
| 5,706,273 | A | 1/1998 | Guerreri |
| 5,910,653 | A | 6/1999 | Campo |
| 6,588,447 | B1 | 7/2003 | Hendey |
| 6,774,807 | B1 | 8/2004 | Lehfeldt |
| 7,007,558 | B1 | 3/2006 | Carpenter |
| 8,344,881 | B1 | 1/2013 | Hays |
| 2002/0126157 | A1 | 9/2002 | Farago et al. |
| 2002/0193144 | A1 | 12/2002 | Belski et al. |
| 2004/0021568 | A1* | 2/2004 | Seal ..................... G01R 22/066 340/551 |
| 2005/0066746 | A1 | 3/2005 | Winter |
| 2007/0229256 | A1 | 10/2007 | Seal et al. |
| 2007/0241930 | A1* | 10/2007 | Qureshi ................ G01D 4/002 340/870.02 |

(Continued)

FOREIGN PATENT DOCUMENTS

EP    0359665    12/1992
KR    100959519    5/2010

OTHER PUBLICATIONS

Zigovszki, Szabolcs; U.S. Patent Application entitled: Real-Time Flow Compensation in Usage Accumulation, U.S. Appl. No. 14/490,375, filed Sep. 18, 2014, 28 pgs.

(Continued)

*Primary Examiner* — Kevin Kim
(74) *Attorney, Agent, or Firm* — Taylor English Duma LLP

(57) ABSTRACT

Technologies are described herein for detecting a reverse flow condition in a meter and providing an associated alert. An amount of reverse flow in the meter is accumulated over a time period. If the accumulated amount of reverse flow over the time period exceeds a threshold value, a reverse flow alert is provided.

17 Claims, 4 Drawing Sheets

(56) References Cited

U.S. PATENT DOCUMENTS

| | | | |
|---|---|---|---|
| 2010/0321205 A1* | 12/2010 | Olson | G01D 4/004 340/870.02 |
| 2012/0074927 A1 | 3/2012 | Ramirez | |
| 2013/0088353 A1 | 4/2013 | Lafrance | |
| 2013/0113631 A1 | 5/2013 | Pitchford | |
| 2013/0257630 A1 | 10/2013 | Brennan et al. | |
| 2014/0281624 A1 | 9/2014 | Cahill-O'Brien et al. | |
| 2014/0361908 A1* | 12/2014 | Laird | G01D 4/002 340/870.02 |

OTHER PUBLICATIONS

Zigovszki, Szabolcs; U.S. Patent Application entitled: Mode Activation Using Light Detection, U.S. Appl. No. 14/490,381, filed Sep. 18, 2014, 31 pgs.

Zigovszki, Szabolcs; U.S. Patent Application entitled: Tamper Detection Through Magnetic Sensing, U.S. Appl. No. 14/490,403, filed Sep. 18, 2014; 24 pgs.

Cole, Martin; U.S. Patent Application Entitled: Adjustable Meter With Tamper Detection, U.S. Appl. No. 14/490,095, filed Sep. 18, 2014; 36 pgs.

Cullinan, Thomas; U.S. Patent Application entitled: Solid-State Register Initiated Poll of Status Information having U.S. Appl. No. 14/954,322, filed Nov. 30, 2015, 26 pgs.

Zigovszki, Szabolcs; International Search Report and Written Opinion for serial No. PCT/US15/44156, filed Aug. 7, 2015, mailed Nov. 6, 2015, 9 pgs.

Zigovszki, Szabolcs; International Search Report and Written Opinion for serial No. PCT/US15/50080, filed Sep. 15, 2015, mailed Dec. 10, 2015, 8 pgs.

Zigovszki, Szabolcs; International Search Report and Written Opinion for serial No. PCT/US15/44147, filed Aug. 7, 2015, mailed Nov. 6, 2015, 8 pgs.

Martin, Cole; International Search Report and Written Opinion for Application No. PCT/US15/44154, filed Aug. 7, 2015, mailed Dec. 31, 2015, 12 pgs.

Zigovszki, Szabolcs; PCT Application entitled: Real-Time Flow Compensation in Usage Accumulcation having serial No. PCT/US15/44156, filed Aug. 7, 2015, 26 pgs.

Zigovszki, Szabolcs; PCT Application entitled: Tamper Detection Through Magnetic Sensing having serial No. PCT/US15/50080, filed Sep. 15, 2015, 26 pgs.

Zigovszki, Szabolcs; PCT Application entitled: Reverse Flow Detection and Annunication having serial No. PCT/US15/44147, filed Aug. 7, 2015, 24 pgs.

Martin, Cole; PCT Application entitled: Adjustable Meter With Tamper Detection having serial No. PCT/US15/44154, field Aug. 7, 2015, 35 pgs.

Zigovszki, Szabolcs; Non-Final Office Action for U.S. Appl. No. 14/490,403, filed Sep. 18, 2014, mailed Mar. 31, 2016, 26 pgs.

Zigovszki, Szabolcs; Non-Final Office Action for U.S. Appl. No. 14/490,381, filed Sep. 18, 2014, mailed Jul. 13, 2016, 28 pgs.

Cole, Martin; Applicant Initiated Interview Summary for U.S. Appl. No. 14/490,095, filed Sep. 18, 2014, mailed Jul. 6, 2016, 3 pgs.

Cole, Martin; Non-Final Office Action for U.S. Appl. No. 14/490,095, filed Sep. 18, 2014, mailed Jun. 15, 2016, 24 pgs.

* cited by examiner

REVERSE FLOW DETECTION AND ANNUNCIATION

BACKGROUND

Conventional water, gas, or other utility meters normally include a mechanical register for accumulating and displaying usage data for customers and utility provider personnel (e.g., meter readers). A typical register may include odometer-style wheels and/or dials that collectively record the total volume of product used. These registers may be driven by a mechanical or magnetic coupling with a measuring element inside of a measuring chamber of the meter. Gears in the register convert the motion of the measuring element to the proper usage increment for display on the dials and/or wheels. The mechanical register may further include a means of converting the current position of the dials and wheels to an electronic signal for sending the current usage data electronically to automatic meter reading ("AMR") or advanced metering infrastructure ("AMI") systems for remote reading and/or monitoring of the metered consumption.

As an alternative to mechanical registers, a solid-state register ("SSR") may be utilized in meters by a utility provider. SSRs are totally electronic with no mechanical gearing or moving parts and may interface magnetically with the measuring element inside of the measuring chamber of the meter. The SSR uses electronics and firmware programming to detect flow, accumulate usage, and display usage on an LCD or other electronic display. Other operational metrics beyond usage may also be determined and/or displayed, such as average flow rate, instant flow rate, reverse flow, and the like. The programmatic nature of the SSR may allow a single model of register to be programmed with the appropriate parameters and scaling factors to work with a variety of meters and provide higher consumption resolution and accuracy than mechanical odometer registers. SSRs may also provide for the implementation of features not available in traditional mechanical registers, such as accumulation, display, and reporting of operational metrics beyond usage, alarming capability via AMR/AMI systems for tamper conditions and reverse flow, and the like.

It is with respect to these and other considerations that the disclosure made herein is presented.

BRIEF SUMMARY

The present disclosure relates to technologies for detecting a reverse flow condition in a meter and providing an associated alert. According to some embodiments, a method of detecting a reverse flow condition in a meter comprises accumulating an amount of reverse flow in the meter over a time period. It is determined whether the accumulated amount of reverse flow over the time period exceeds a threshold value, and if the accumulated amount of reverse flow over the time period exceeds the threshold value, a reverse flow alert is provided.

According to further embodiments, a computer-readable storage medium comprises processor-executable instructions that, when executed by a processing unit in a meter, causes the processing unit to accumulate an amount of reverse flow through the meter over a time period. It is determined whether the accumulated amount of reverse flow over the time period exceeds a first threshold value, and if the accumulated amount of reverse flow over the time period exceeds the first threshold value, a first reverse flow alert indicating a reverse flow condition is provided.

According to further embodiments, a system comprises a measuring chamber of a meter assembly, the measuring chamber containing a measuring device, and a solid-state register implemented in the meter assembly. The solid-state register is magnetically coupled to the measuring device and includes a microcontroller. The microcontroller is configured to accumulate an amount of reverse flow through the measuring chamber over a time period. The microcontroller further determines whether the accumulated amount of reverse flow over the time period exceeds a threshold value, and if the accumulated amount of reverse flow over the time period exceeds the threshold value, the microcontroller provides a reverse flow alert indicating a reverse flow condition.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for detecting a reverse flow condition in a meter and providing an associated alert. Using the technologies described herein, a solid-state register ("SSR") may be configured to monitor for a reverse flow condition in an attached meter by measuring the flow through the meter and, if an amount of continuous reverse flow within a configured time window exceeds a reverse amount threshold, to provide an alert of the reverse flow condition. The reverse amount threshold and the time window may be configurable within the SSR and may be set based on the type of meter used, the product being metered, whether a backflow preventer is installed in-line with the meter, and the like. For example, the SSR may be configured to detect the reverse flow condition when 10 gallons of continuous backflow occurs in 120 minutes, or when 5 gallons of backflow occurs in 1 minute. The reverse flow condition detection routine may occur during normal usage accumulation by the SSR, for example. By implementing the reverse flow detection routine(s) described herein, a utility provider may be alerted to a reverse flow condition at a customer's site in a timely fashion, providing the opportunity for personnel to determine the cause of the reverse flow condition and/or mitigate damage caused by the condition.

Figure 1:
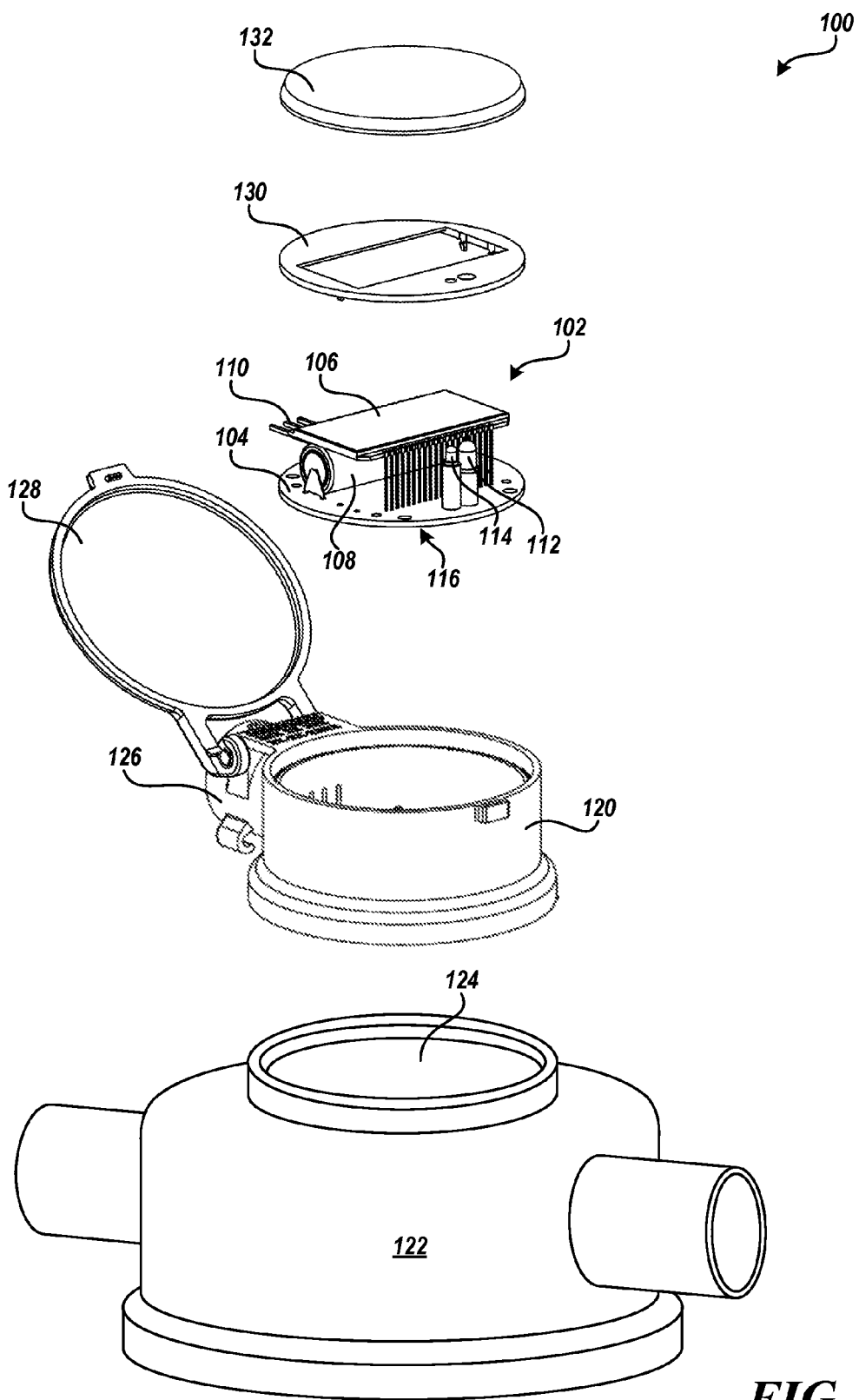
FIG. 1 is a perspective view showing an assembly of an illustrative water meter including a solid-state register, according to embodiments described herein.

FIG. 1 is a perspective view showing an assembly of an illustrative water meter 100 that implements an SSR 102, according to some embodiments. According to embodiments, the SSR 102 comprises a printed circuit board ("PCB") 104 upon which various components are attached. In some embodiments, the SSR 102 may include a liquid crystal display ("LCD") 106 or other electronic display connected to the PCB 104. The LCD 106 may display the accumulated usage to a local observer, such as a customer, installer, meter reader, or other utility provider personnel. The LCD 106 may also display other operational parameter information, such as flow rates, meter ID, model number of the meter 100 and/or SSR 102, test mode accumulation, error codes, and the like. The LCD 106 may further indicate status information for the meter, such as units of measurement displayed, reverse flow condition or other error conditions, flow direction, current operation mode, battery condition, and the like.

The SSR 102 may further include a battery 108 for powering the operation of the electronic components of the SSR. In some embodiments, the power requirements of the SSR 102 may allow the battery 108 to power the SSR for an extended period of time in normal operation, such as 20 years. The SSR 102 may also include an interface connector 110 for electronically connecting the SSR to an external device, such as an AMR or AMI communication device, a portable programming device, or the like. In some embodiments, the interface connector 110 may comprise a three-wire connector. The SSR 102 may also include an optical sensor 112 or photo-detector. The optical sensor 112 may allow the SSR 102 to detect light conditions within the meter 100 in order to determine the correct mode for operation. The optical sensor 112 may also serve as an infrared ("IR") detector. The SSR 102 may further include an IR emitter 114, which together with the optical sensor 112, provides an IR port for the SSR to communicate with external devices via IR, such as portable programming devices and the like.

The SSR 102 may be shaped and sized to be inserted into an enclosure 120. The enclosure may be mechanically configured to be attached to the measuring chamber 122 of the meter 100, such that a bottom surface 116 of the PCB 104 is within a define distance of a top surface 124 of the measuring chamber. The bottom surface 116 of the PCB 104 may hold flow sensors and other detection devices that interface with a magnetic measuring element within the measuring chamber 122, such as rotating magnetic disc. The SSR 102 and the enclosure 120 may be configured to be compatible with a variety of measuring chambers 122 for a variety of models and types of meters 100.

Once positioned in the enclosure 120, the SSR 102 may be covered by a faceplate 130 and lens 132. The faceplate may include openings for the LCD 106, the optical sensor 112, and the IR emitter 114. The lens 132 may be sealed to the enclosure 120 in order to protect the SSR 102 from liquids or other external contaminants. The enclosure 120 may further include a recess 126 through which the interface connector 110 may extend allowing the SSR 102 to be connected to the external devices. The enclosure 120 may also include a cover 128 or lid which may be closed over the SSR 102 in order to protect the lens 132 as well as isolate the optical sensor 112 from external light sources.

Figure 2:
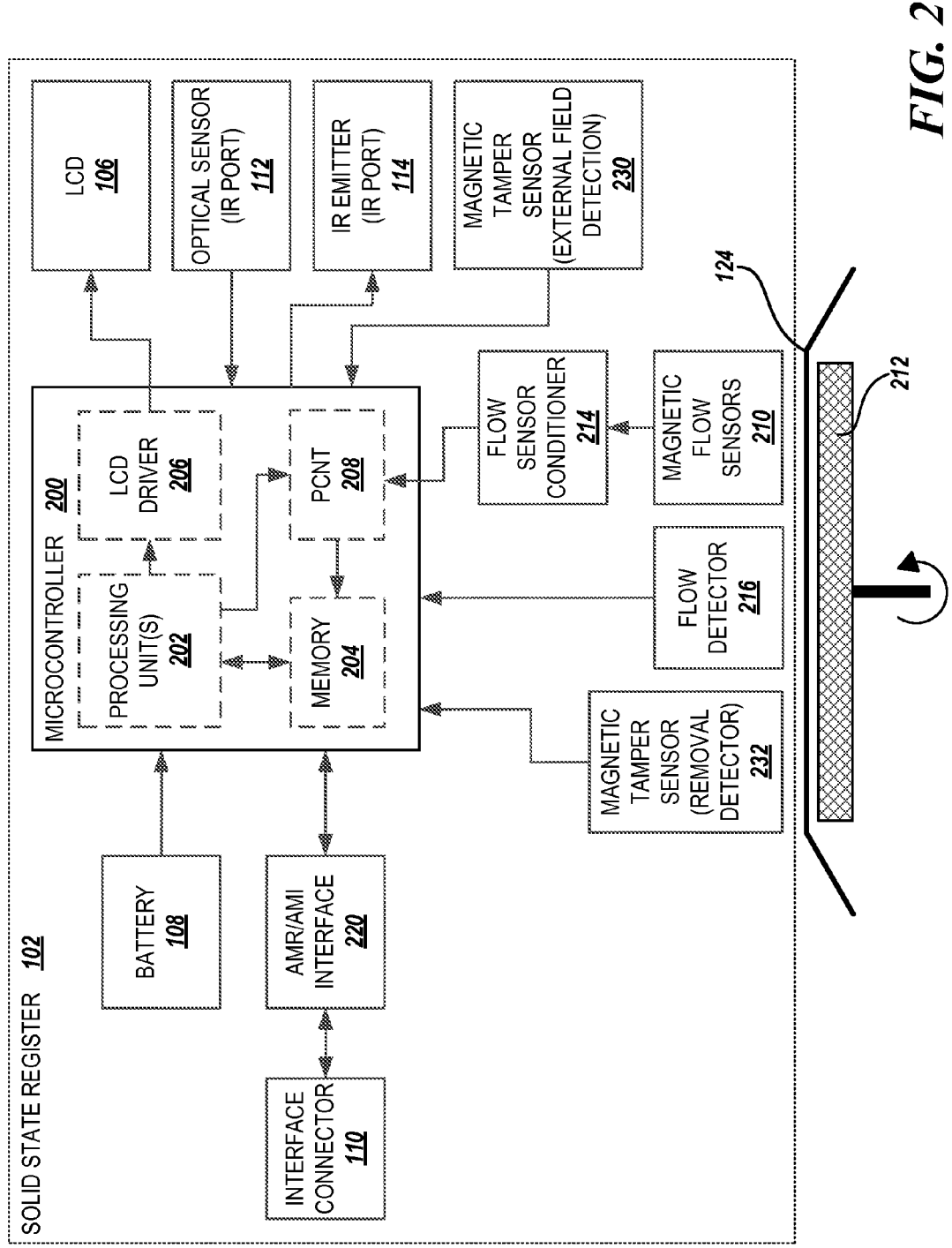
FIG. 2 is a block diagram of an illustrative solid-state register capable of executing the software components described herein for detecting a reverse flow condition in a meter and providing an associated alert, according to embodiments described herein.

FIG. 2 shows a block diagram of the SSR 102, according to some embodiments. The SSR 102 includes a microcontroller 200 for performing the functions of the SSR as described herein. The microcontroller 200 may be a microcontroller unit ("MCU") designed for smart meter applications, such as the MC9S08GW64 from Freescale Semiconductor of Austin, Tex. The microcontroller 200 contains a variety of modules in a single, integrated circuit, including one or more processing units 202. The processing unit(s) 202 represent standard programmable processors that perform arithmetic and logical operations necessary for the operation of the SSR 102. The processing unit(s) 202 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The microcontroller 200 further includes a memory 204. The memory 204 may comprise a computer-readable storage medium for storing processor-executable instructions, data structures and other information. The memory 204 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 204 may store a firmware that comprises instructions, commands and data necessary for operation of the SSR 102. According to some embodiments, the memory 204 may store processor-executable instructions that, when executed by the processing units 202, perform the routine 300 for detecting a reverse flow condition in a meter and providing an associated alert, as described herein.

In addition to the memory 204, the microcontroller 200 may have access to other computer-readable media storing program modules, data structures, and other data described herein for detecting a reverse flow condition in a meter and providing an associated alert. It will be appreciated by those skilled in the art that computer-readable media can be any available media that may be accessed by the microcontroller 200 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

The microcontroller 200 may further include an integrated LCD driver 206 for driving the LCD 106 or other electronic display to display accumulated usage information, operations parameters, error codes, status information, and the like. In some embodiments, the LCD 106 may comprise an LCD panel specifically designed for utility meter applications, such as the W527110 LCD panel from Truly Semiconductors Ltd. of Kwai Chung, Hong Kong.

The microcontroller 200 may also include an integrated pulse counter unit 208, also referred to as a position counter ("PCNT"). The pulse counter unit 208 is a low power pulse sequence counter that receives one or more input signals from magnetic flow sensors 210 in the SSR 102. The magnetic flow sensors 210 may represent rotational sensors that sense the rotation of the measurement device, such as a rotating magnet 212, contained in the measurement chamber 122 of the meter 100. The magnetic flow sensors 210 send signals, or "pulses," based on the sensed rotation of the rotating magnet 212 to the pulse counter unit 208 that allow the pulse counter unit to accumulate a pulse count representing a volume of water, gas, electricity, or other product flowing through the meter 100.

In some embodiments, the magnetic flow sensors 210 may comprise a tunneling magnetoresistance ("TMR") angle sensor, such as the NVE AAT001-10E from NVE Corporation of Eden Prairie Minn. The TMR sensor may provide rotational position measurements in a rotating magnetic field that provides the necessary pulse sequences to the pulse counter unit 208 for the pulse counter unit to determine both the flow direction and quantity of the flow. The magnetic flow sensors 210 may be mounted on the bottom surface 116 of the PCB 104 such that it is in proximity of the magnetic field created by the rotating magnet 212 through the top surface 124 when the enclosure 120 containing the SSR 102 is coupled to the measurement chamber 122. According to some embodiments, the signals from the magnetic flow sensors 210 may be pre-processed by a flow sensor conditioner 214 before being provided to the pulse counter unit 208. For example the signals from the magnetic flow sensors 210 may pass through a dual push-pull comparator, such as the Microchip MCP6542 from Microchip Technology Inc. of Chandler, Ariz.

In some embodiments, the pulse counter unit 208 may be configured to operate in a two-signal gray mode (also referred to as quadrature mode) to detect and accumulate pulse counts for both forward and reverse flows. Once configured by the firmware, the pulse counter unit 208 may run independently of the processing units as long as flow is detected in the meter 100. According to some embodiments, the pulse counter unit 208 may maintain two distinct registers, one forward flow pulse counter and one reverse flow pulse counter.

According to some embodiments, the SSR 102 further includes a flow detector 216. The flow detector 216 may comprise a low-power reed switch or other sensor that detects a change in the magnetic field from the rotating magnet 212 and signals the microcontroller 200 to provide power to the magnetic flow sensors 210 and/or to activate the pulse counter unit 208. In this way, the SSR 102 may operate in an extremely low power mode when no flow is detected to preserve the life of the battery 108. As with the magnetic flow sensors 210, the flow detector 216 may be mounted on the bottom surface 116 of the PCB 104 such that it is in proximity of the magnetic field created by the rotating magnet 212 through the top surface 124 of the measurement chamber 122.

The microcontroller 200 may further connect with other components of the SSR 102 through a variety of interfaces of the microcontroller. For example, the microcontroller 200 interfaces with the optical sensor 112 described above in order to detect changes in external light conditions in order to switch the SSR 102 to the appropriate mode of operation. In some embodiments, the optical sensor 112 may comprise a phototransistor, such as the PT333-3C from Everlight Electronics Co., Ltd. of New Taipei City, Taiwan. In further embodiments, the microcontroller 200 may further utilize interfaces with the optical sensor 112 and the IR emitter 114 to provide an IR port for two-way communication with external devices, for configuration of the SSR 102, updating of the firmware, and the like.

The microcontroller 200 may further include an AMR/AMI interface 220 for communicating with an external device through the interface connector 110, such as an AMR or AMI communication device, a portable programming device, or the like. The AMR/AMI interface 220 may provide for receiving and responding to interrogatories and commands from the external device, such as a request for accumulated usage data or current status information regarding the SSR. The AMR/AMI interface 220 may further allow the microcontroller 200 to "wakeup" or otherwise initiate communication with the external device, according to further embodiments. In some embodiments, the AMR/AMI interface 220 may utilize a universal asynchronous receiver/transmitter ("UART") module integrated in the microcontroller 200 to provide a 3-wire, two-way serial interface with the external device.

In some embodiments, the SSR 102 may include a number of magnetic tamper sensors, such as magnetic tamper sensors 230 and 232, that interface with the microcontroller 200. For example, an external field detection sensor 230 may interface with the microcontroller 200 and provide a signal when the SSR 102 is subject to an external magnetic field. The external field detection sensor 230 may comprise a digital output magnetic sensor, such as the TCS20DPR from Toshiba of Tokyo, Japan, that may provide an indication of the relative strength of the detected magnetic field. Additionally or alternatively, a removal detector sensor 232 may interface with the microcontroller 200 and provide a signal indicating if the detector is removed from the magnetic field of the rotating magnet 212, indicating that the SSR 102 may have been dislodged or removed from the measurement chamber 122 of the meter 100. In some embodiments, the removal detector sensor 232 may comprise a three-axis digital magnetometer, such as the MAG3110 from Freescale Semiconductor. As with the magnetic flow sensors 210 and the flow detector 216, the removal detector sensor 232 may be mounted on the bottom surface 116 of the PCB 104 such that it is in proximity of the magnetic field created by the rotating magnet 212 through the top surface 124 of the measurement chamber 122.

It will be appreciated that the structure and/or functionality of the SSR 102 may be different than that illustrated in FIG. 2 and described herein. For example, while the processing unit(s) 202, memory 204, LCD driver 206, and pulse counter unit 208 are shown as modules integrated into the microcontroller 200, these components may represent discrete circuitry or components, or may be distributed among multiple integrated circuit packages. Similarly, the microcontroller 200, the flow sensor conditioner 214, the AMR/AMI interface 220 and other components of the SSR 102 may be integrated within a common integrated circuit package or distributed among multiple integrated circuit packages. The illustrated connection pathways are provided for purposes of illustration and not of limitation, and some components and/or interconnections may be omitted for purposes of clarity. It will be further appreciated that the SSR 102 may not include all of the components shown in FIG. 2, may include other components that are not explicitly shown in FIG. 2 or may utilize an architecture completely different than that shown in FIG. 2.

Figure 3:
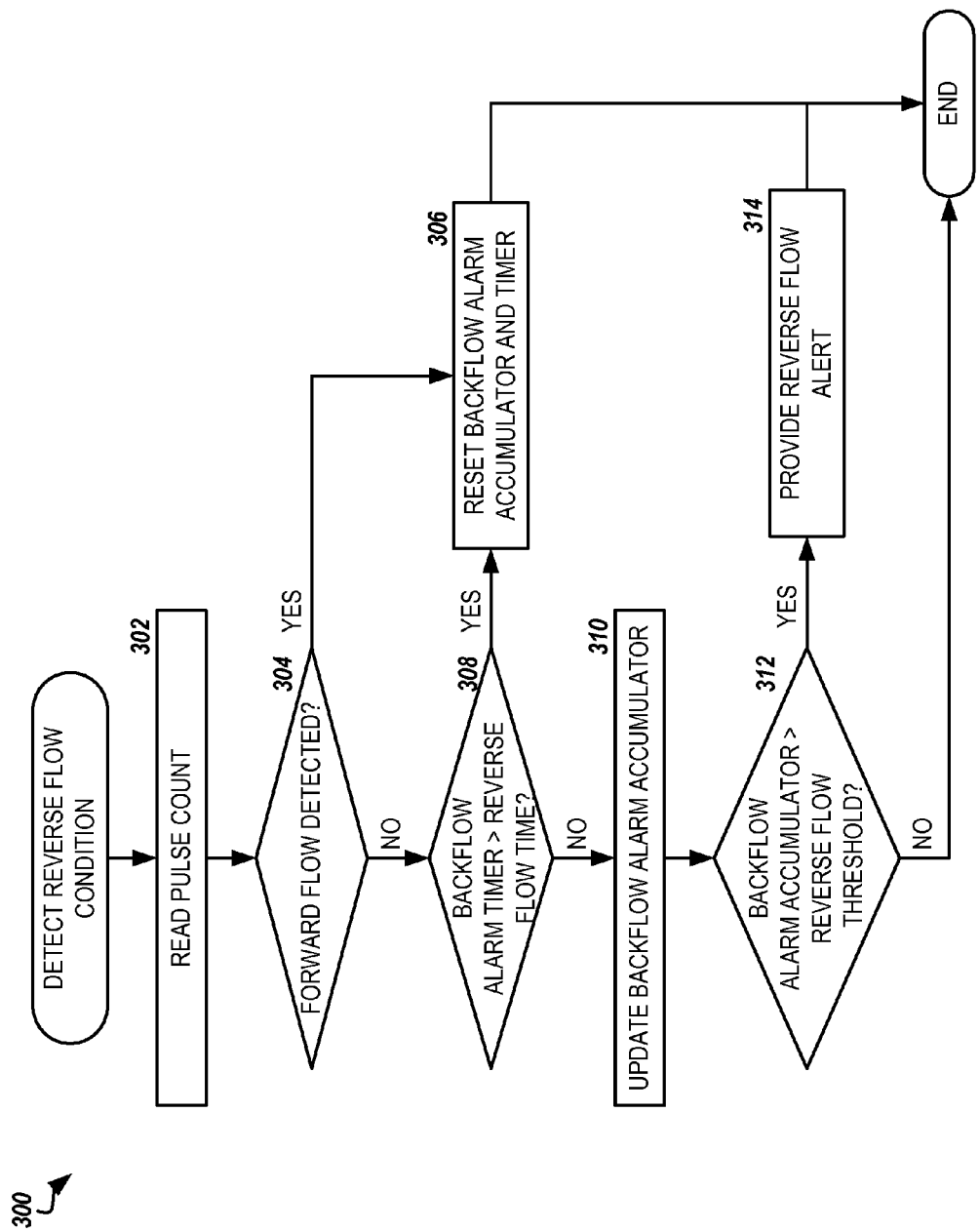
FIG. 3 is a flow diagram showing one routine for detecting a reverse flow condition in a meter and providing an associated alert, according to embodiments described herein.

FIG. 3 is a flow diagram showing one method for detecting a reverse flow condition in a meter and providing an associated alert, according to some embodiments. Specifically, FIG. 3 illustrates one reverse flow detection routine 300 that may be implemented in the SSR 102. According to some embodiments, the routine 300 may be performed by the microcontroller 200 of the SSR 102 as shown in FIG. 2. According to some embodiments, the microcontroller 200 may be programmed to periodically check for a reverse flow condition in conjunction with a normal routine for usage accumulation. For example, while the SSR 102 is operating in a low power SLEEP mode, the microcontroller 200 may be woken up to update the total usage accumulation and execute the reverse flow detection routine 300 at infrequent intervals, such as every 30 seconds. In an ACTIVE mode of operation, where the LCD 106 is active and the usage accumulation is displayed on the LCD and updated frequently, the microcontroller 200 may update usage accumulation and check for the reverse flow condition more frequently, such as every 125 ms. In other embodiments, the routine 300 may be performed by the microcontroller 200 independently of the usage accumulation function and/or at other intervals beyond the 125 ms and 30 seconds described herein.

Figure 4:
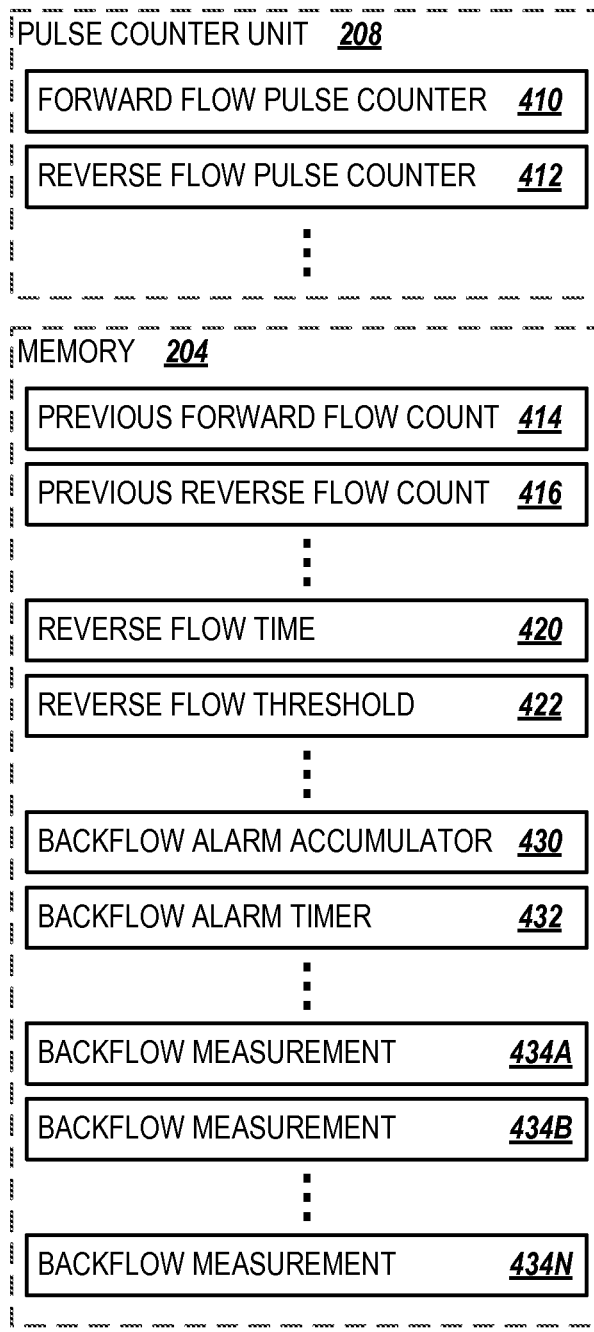
FIG. 4 is a data structure diagram showing registers stored in a processing unit and data elements stored in a memory of a microcontroller, according to embodiments described herein.

The routine 300 begins at step 302, where the microcontroller 200 reads the pulse counter(s) maintained by the pulse counter unit 208. As described above, the pulse counter unit 208 may maintain two distinct registers, a forward flow pulse counter 410 and a reverse flow pulse counter 412, as shown in FIG. 4. The forward flow pulse counter 410 and the reverse flow pulse counter 412 may be incremented by the pulse counter unit 208 upon detection of the corresponding signals from the magnetic flow sensors 210 indicating forward or reverse flow. Each pulse represents a specific volume of flow through the meter 100, represented by the K-factor. The K-factor equals the number of units of flow per pulse, or:

K-factor=1/# of pulses per unit flow where the K-factor and the unit flow are represented in the same units (gallons, liters, ft$^3$, etc.). According to embodiments, a nominal K-factor is configured in the SSR 102 based on the type or model of the meter 100 in which the SSR 102 is implemented.

To determine the number of pulses since the last measurement, the microcontroller 200 may further maintain two additional values in the memory 204 or other storage location, a previous forward flow count 414 and a previous reverse flow count 416. Each time the microcontroller 200 updates the total usage accumulation and/or executes the reverse flow detection routine 300, these registers may be updated with the current values of the forward flow pulse counter 410 and the reverse flow pulse counter 412, respectively. The number of forward flow and reverse flow pulses since the last measurement may be determined by subtracting the previous forward flow count 414 from the forward flow pulse counter 410 and the previous reverse flow count 416 from the reverse flow pulse counter 412.

Next, the routine 300 proceeds from step 302 to step 304, where the microcontroller 200 determines if any forward flow has been detected. As described above, the reverse flow condition may be defined as when the amount of continuous reverse flow within a configured time window exceeds a reverse amount threshold. The time window and the reverse amount threshold may be configured in the SSR 102 in a reverse flow time 420 and a reverse flow threshold 422 stored in the memory 204 or other storage location accessible to the microcontroller 200, as further shown in FIG. 4. In order to detect the reverse flow condition, the microcontroller 200 may further maintain a backflow alarm accumulator 430 and a backflow alarm timer 432 in the memory 204, as will be described below.

In order to ensure that the measured reverse flow is continuous, the microcontroller 200 may reset the backflow alarm accumulator 430 and the backflow alarm timer 432 upon detection of any forward flow, according to some embodiments. For purposes of the detection, forward flow may be defined as some minimum number of forward flow pulses counted since the last measurement, as read in step 302. For example, forward flow may be determined if 8 forward flow pulses, representing a minimal amount of forward flow, have been counted since the last measurement. If forward flow is detected, the routine 300 proceeds to step 306, where the microcontroller 200 resets the backflow alarm accumulator 430 and the backflow alarm timer 432 to zero to restart the reverse flow detection process and then the routine 300 ends.

If no forward flow has been detected, the routine 300 proceeds from step 304 to step 308, where the microcontroller determines whether the backflow alarm timer 432 exceeds the reverse flow time 420. The backflow alarm timer 432 may indicate the time over which reverse flow has been accumulated in the backflow alarm accumulator 430, e.g., since the last reset. The microcontroller 200 may compare the backflow alarm timer 432 to the reverse flow time 420 configured for the SSR 102 in order to determine whether the time window for accumulating reverse flow for reverse flow condition detection has expired. If the time window has expired, the routine 300 proceeds to step 306, where the microcontroller 200 resets the backflow alarm accumulator 430 and the backflow alarm timer 432, as described above.

If the time window for accumulating reverse flow has not expired, the routine 300 proceeds from step 308 to step 310, where the microcontroller 200 updates the backflow alarm accumulator 430 based on the amount of reverse flow detected at step 302. In some embodiments, the reverse flow threshold 422 is specified in, and the backflow alarm accumulator 430 maintained in, units of flow, such as gallons, liters, ft$^3$, etc. The backflow alarm accumulator 430 may be updated by adding the amount of flow indicated by the reverse pulse count to the accumulator. For example, the microcontroller 200 may utilize the following formula to update the backflow alarm accumulator 430:

back flow alarm accumulator=back flow alarm accumulator+(reverse pulse count*K-factor (gallons))

In other embodiments, the reverse flow threshold 422 and the backflow alarm accumulator 430 may be maintained in number of pulses, and the backflow alarm accumulator may be updated by simply adding the reverse pulse count to the accumulator.

Next, the routine 300 proceeds from step 310 to step 312, where the microcontroller 200 determines whether the backflow alarm accumulator 430 exceeds the reverse flow threshold 422 configured for the SSR 102 in order to determine if the reverse flow condition exists. If the backflow alarm accumulator 430 does not exceed the reverse flow threshold 422, then the routine 300 ends.

If the backflow alarm accumulator 430 does exceed the reverse flow threshold 422, the routine 300 proceeds from step 312 to step 314 where a reverse flow alert is provided. For example, the microcontroller 200 may provide a signal to the LCD 106 to display an error message. The error message may comprise a code, icon, light, text, numbers, or the like. In some embodiments, the error message may comprise a code that is displayed on a numeric section of the LCD 106. The code may include text, such as "Err," and/or a number, such as "004." The number may indicate a particular error. For example, the code "Err004" may indicate that a reverse flow condition has been detected. In certain embodiments, the LCD 106 alternately displays any error messages and consumption information. For instance, when activated, the LCD 106 may display an error message for 1 second followed by consumption information for 3 seconds. Such a pattern may be repeated while the LCD 106 is active.

In addition or alternatively, providing the reverse flow alert includes the microcontroller 200 providing a signal to the AMR/AMI interface 220 to include an error flag in an AMR message, according to some embodiments. For example, the AMR message may comprise one or more status flags wherein a value (such as 1) indicates that an error or status is present (or has been present) and a different value (such as 0) indicates that no error or status is present (or has been present). In some embodiments, the AMR message comprises a plurality of status flags in a set order. For instance, the AMR message may comprise 4 status flags in a set order, wherein a first status flag indicates whether an external magnetic tamper is detected, a second status flag may indicate whether a low battery is detected, a third status flag may indicate whether a reverse flow is detected, and a fourth status flag may indicate whether a register removal is detected. In accordance with such embodiments, providing a reverse flow alert includes setting the third status flag in the AMR message to a value indicating that a reverse flow condition is detected.

In some embodiments, two or more reverse flow thresholds 422 may be configured for the SSR 102. The microcontroller 200 may test the backflow alarm accumulator 430 against each of the reverse flow thresholds 422 levels and raise different alerts depending on which threshold(s) are exceeded. For example, the microcontroller 200 may cause the LCD 106 to display a different error message depending on which threshold is exceeded. Similarly, different status flags in the AMR message may be set to indicate which of the threshold(s) have been exceeded. Having two or more levels of alerts may allow utility provider personnel to respond to one or another based on conditions at the customer site, such as whether or not a backflow preventer is present, whether installation personnel are currently running tests at the site, and the like. From step 314, the routine 300 ends.

In further embodiments, the SSR 102 may be configured to accumulate backflow measurements in a sliding window over a time period defined by the reverse flow time 420. With reference to FIG. 4, instead of the backflow alarm accumulator 430 and the backflow alarm timer 432, the microcontroller 200 may maintain some number N of backflow measurements 434A-434N (referred to herein generally as backflow measurements 434) in the memory 204 or other storage location indicating the reverse pulse counts measured over the last N iterations of the reverse flow detection routine. The number N may depend on the frequency at which the reverse flow detection routine is executed and the reverse flow time 420 configured for the SSR 102. In each iteration of the routine, the microcontroller 200 may calculate the total reverse flow over the time period from the N backflow measurements 434 and compare the total reverse flow to the reverse flow threshold 422. If the total reverse flow over the reverse flow time 420 exceeds the reverse flow threshold 422, then the microcontroller 200 may raise the reverse flow condition alert, as described above in regard to step 314. In addition, the microcontroller 200 may reset the N backflow measurements upon the detection of forward flow in the meter 100 in order to ensure that the total reverse flow calculated represents continuous reverse flow.

FIG. 4 is a data structure diagram showing a number of data elements or data structures in computer storage, as described above. It will be appreciated by one skilled in the art that data structures shown in the figure may represent rows in a database table, instances of objects stored in a computer memory, programmatic structures, or any other data container commonly known in the art. Each data element may represent one or more fields or columns of a database table, one or more attributes of an object, one or more member variables of a programmatic structure, a register in a processing unit, or any other unit of data or data structure commonly known in the art. The implementation is a matter of choice, and may depend on the technology, performance, and other requirements of the computing system upon which the data structures and data elements are implemented.

Based on the foregoing, it will be appreciated that technologies for detecting a reverse flow condition in a meter and providing an associated alert are presented herein. While embodiments are described herein in regard to an SSR 102 implemented in a water meter 100, it will be appreciated that technologies described herein may be utilized in any programmable or configurable solid-state or electronic meter that measures the flow of any product where a reverse flow condition may exist. The above-described embodiments are merely possible examples of implementations, set forth for a clear understanding of the principles of the present disclosure.

The logical operations, functions or steps described herein as part of a method, process or routine may be implemented (1) as a sequence of processor-implemented acts, software modules or portions of code running on a microcontroller, processing unit, or other computing system and/or (2) as interconnected machine logic circuits or circuit modules within the microcontroller, processing unit or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method for detecting a reverse flow condition in a meter, the method comprising the steps of:
   accumulating, by a microcontroller in the meter, an amount of reverse flow in the meter over a time period;
   determining, by the microcontroller, whether the accumulated amount of reverse flow over the time period exceeds a threshold value; and
   upon determining that the accumulated amount of reverse flow over the time period exceeds the threshold value, providing, by the microcontroller, a reverse flow alert,
   wherein accumulating the amount of reverse flow in the meter over the time period comprises periodically determining a reverse pulse count indicating a number of reverse flow pulses that occurred since a last measurement and adding an amount of flow represented by the reverse pulse count to a backflow accumulator in the microcontroller.

2. The method of claim 1, wherein the number of reverse flow pulses that occurred since the last measurement are maintained by a pulse counting unit of the microcontroller.

3. The method of claim 1, wherein a measurement of forward flow in the meter resets the accumulated amount of reverse flow and the time period.

4. The method of claim 1, wherein the microcontroller is implemented in a solid-state register of a water meter assembly.

5. The method of claim 4, wherein providing the reverse flow alert comprises:
   providing, by the microcontroller, a signal to a display in the solid-state register to display a message indicating the reverse flow condition; and
   displaying, by the display, the message.

6. The method of claim 4, wherein providing the reverse flow alert comprises:
   providing, by the microcontroller, a signal to an interface in the solid-state register to include a flag in an automatic meter reading message indicating the reverse flow condition; and
   including, by the interface, the flag in the automatic meter reading message.

7. The method of claim 1, wherein the time period and the threshold value are configurable in the microcontroller.

8. The method of claim 1, wherein a plurality of threshold values are configured in the microcontroller, and wherein the microcontroller provides a different reverse flow alert based upon which of the plurality of threshold values are exceeded by the accumulated amount of reverse flow over the time period.

9. A computer-readable storage medium having processor-executable instructions stored thereon that, when executed by a processing unit, cause the processing unit to:
   accumulate an amount of reverse flow through a meter over a time period;
   determine whether the accumulated amount of reverse flow over the time period exceeds a first threshold value;
   upon determining that the accumulated amount of reverse flow over the time period exceeds the first threshold value, providing a first reverse flow alert indicating a reverse flow condition;
   determine whether the accumulated amount of reverse flow over the time period exceeds a second threshold value; and
   upon determining that the accumulated amount of reverse flow over the time period exceeds the second threshold value, providing a second reverse flow alert.

10. The computer-readable storage medium of claim 9, wherein accumulating the amount of reverse flow in the meter over the time period comprises periodically determining a reverse pulse count indicating a number of reverse flow pulses that occurred since a last measurement and adding an amount of flow represented by the reverse pulse count to a backflow accumulator.

11. The computer-readable storage medium of claim 10, having additional processor-executable instructions stored thereon that cause the processing unit to:
   detect forward flow in the meter; and
   upon detecting forward flow in the meter, reset the backflow accumulator and the time period.

12. The computer-readable storage medium of claim 9, wherein providing the first reverse flow alert comprises providing a signal to a display to cause the display to display a message indicating the reverse flow condition.

13. The computer-readable storage medium of claim 9, wherein providing the first reverse flow alert comprises providing a signal to an interface to cause the interface to include a flag in an automatic meter reading message indicating the reverse flow condition.

14. A system comprising:
   a measuring chamber of a meter assembly, the measuring chamber containing a measuring device; and
   a solid-state register implemented in the meter assembly, the solid-state register magnetically coupled to the measuring device and comprising a microcontroller, the microcontroller configured to
      accumulate an amount of reverse flow through the measuring chamber over a time period,
      determine whether the accumulated amount of reverse flow over the time period exceeds a threshold value, and
      upon determining that the accumulated amount of reverse flow over the time period exceeds the threshold value, providing a reverse flow alert indicating a reverse flow condition,
   wherein accumulating the amount of reverse flow in the meter over the time period comprises periodically determining a reverse pulse count indicating a number of reverse flow pulses that occurred since a last measurement and adding an amount of flow represented by the reverse pulse count to a backflow accumulator in the microcontroller.

15. The system of claim 14, wherein the microcontroller is further configured to:
   detect forward flow through the measuring chamber; and
   upon detecting forward flow in the meter, reset the backflow accumulator and the time period.

16. The system of claim 14, wherein providing the reverse flow alert comprises providing a signal to a display of the solid-state register to cause the display to display a message indicating the reverse flow condition.

17. The system of claim 14, wherein providing the reverse flow alert comprises providing a signal to an interface of the solid-state register to cause the interface to include a flag in an automatic meter reading message indicating the reverse flow condition.

* * * * *